United States Patent [19]

Spencer et al.

[11] 3,868,378

[45] Feb. 25, 1975

[54] IMIDAZO [4,5-F] QUINOLIN-9-OLS

[75] Inventors: Claude F. Spencer; Robert J. Alaimo, both of Norwich, N.Y.

[73] Assignee: Morton-Norwich Products, Inc., Norwich, N.Y.

[22] Filed: June 6, 1973

[21] Appl. No.: 367,499

[52] U.S. Cl...... 260/289 R, 260/283.54, 260/288 R, 260/309.2, 260/346.1 R, 260/478, 260/558 D, 424/258

[51] Int. Cl............................................. C07d 33/50

[58] Field of Search.................... 260/288 R, 268 BQ

[56] References Cited
UNITED STATES PATENTS

| | | | |
|---|---|---|---|
| 3,506,667 | 4/1970 | Kemiusky | 260/287 |
| 3,517,005 | 6/1970 | Cronin et al. | 260/268 BQ |
| 3,761,482 | 9/1973 | Nakogome et al. | 260/283.54 |
| 3,790,576 | 2/1974 | De Wald | 260/288 |
| 3,792,050 | 2/1974 | Hodson | 260/288 |

*Primary Examiner*—Donald G. Daus
*Assistant Examiner*—D. Wheeler
*Attorney, Agent, or Firm*—Anthony J. Franze

[57] ABSTRACT

A series of imidazo [4,5-f] quinolin-9-ols of the formula:

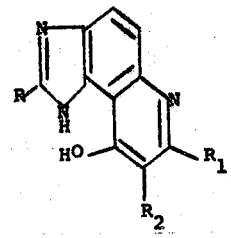

wherein R is phenyl, furyl, p-tolyl, or o-chlorophenyl; $R_1$ is methyl or phenyl; $R_2$ is hydrogen or methyl; and $R_1$ and $R_2$ taken together supply the atoms necessary to form the cyclopentyl ring are effective anthelmintic agents particularly with respect to *Hymenolepis nana*.

8 Claims, No Drawings

IMADAZO [4,5-F] QUINOLIN-9-OLS

This invention is concerned with a series of imidazo [4,5-f] quinolin-9-ols of the formula:

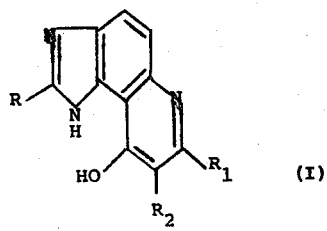

wherein R is phenyl, furyl, p-tolyl, or o-chlorophenyl; $R_1$ is methyl or phenyl; $R_2$ is hydrogen or methyl; and $R_1$ and $R_2$ taken together supply the atoms necessary to form the cyclopentyl ring.

The members of this series of imidazo [4,5-f] quinolin-9-ols are effective anthelmintic agents. When administered perorally to mice harboring the intestinal tapeworm, *Hymenolepis nana*, as an aqueous suspension, conveniently, if desired, prepared using a suspending agent such as sodium alginate, reduction or elimination of that intestinal parasite is accomplished. *Hymenolepis nana* is frequently found in the human intestine.

The methods by which members of the series of this invention are prepared are illustrated in the following examples. Briefly these consist in reacting a 5-amino-2-substituted benzimidazole with ethyl acetoacetate, ethyl 2-cyclopentanecarboxylate, ethyl 2-methylacetoacetate, or ethyl benzoylacetate followed by cyclization in the presence of a high boiling solvent.

EXAMPLE I

7-Methyl-2-phenyl-9-imidazo[4,5-f]quinolinol

A. 5-Amino-2-phenylbenzimidazole

A 22 l flask was set up for reduction at atmospheric pressure and charged with 2,4-dinitrophenylbenzamide (905 g, 3.15 moles), 5% Pd/C with 50 percent moisture (50 g), and ethanol (9.45 l). Hydrogen was passed into the vigorously stirred mixture with the temperature held at 55°–60°. The theoretical amount of hydrogen was absorbed in 4.5 hrs after adding 20 g of catalyst at 2.5 hr. The reaction mixture was cooled in an ice bath and filtered. The residue was washed with a small amount of ethanol and the gray diamine-catalyst mixture was air dried to give 717 g (95 percent).

A 22 l flask provided with steam bath heating was charged with a stirred mixture of the diamine-catalyst (1,122 g, 4.71 moles) in water (7,840 ml). Concd. HCl (784 ml) was added and the mixture was heated to 85° for 2.5 hr. The hot mixture was filtered and cooled. The aqueous solution was then adjusted to pH 9 with concd. NH$_4$OH solution and filtered. After being washed well with water, and dried at 110°, there was obtained 895 g (89 percent) of 5-amino-2-phenylbenzimidazole.

B. Ethyl 3-[5-(2-phenylbenzimidazoylamino) ]crotonate

A mixture of 275 g (1.32 m) of 2-phenyl-5-aminobenzimidazole, 171 g (1.32 m) of ethyl acetoacetate, 200 g of anhydrous calcium sulfate, 13.15 ml of glacial HOAc and 3000 ml of ethanol was refluxed overnight. After filtration the solution was concentrated in vacuo until a solid remained.

Another run was made in the same manner and the products combined to give a total yield of 861 g.

C. 7-Methyl-2-phenyl-9-imidazo[4,5-f]quinolinol

To 8,000 ml of boiling Dowtherm was added 430 g (1.34 m) of ethyl 3-[5-(2-phenylbenzimidazoyl-)amino]crotonate. The reaction was heated at reflux for 90 min then allowed to cool to room temperature. The crystalline solid was triturated in acetone, filtered and air-dried to give 372 g. The crude product was recrystallized from 3,000 ml of dimethylformamide with charcoal. The yield after oven-drying (100°) was 69g, m.p. 322°–335° with decomposition. By diluting the filtrate with H$_2$O, another 188 g was obtained, which was recrystallized from 700 ml of dimethylformamide with charcoal to yield 50 g, m.p. 332°–336° with decomposition.

| Anal. Calcd. for $C_{17}H_{13}N_3O$: | C, 74.16; | H, 4.76; | N, 15.27 |
|---|---|---|---|
| Found: | C, 73.79; | H, 4.68; | N, 15.27 |

EXAMPLE II 2-(2-Furyl)-7-methyl-1H-imidazo[4,5-f]quinolin-9-ol Tetartohydrate A. N-(2-Amino-4-nitrophenyl)-2-furamide To a stirred solution of 4-nitro-o-phenylene diamine (76.5 g, 0.5 mole) in 500 ml of pyridine, was added dropwise 2-furoyl chloride (65 g, 0.5 mole). After the addition was complete the reaction solution was stirred at room temperature for 15 minutes and then at reflux for 2 hr. The hot reaction solution was poured into 6 liters of water to give an oil, which solidified upon standing overnight at room temperature to give 125 g (100 percent) of yellow intermediate. The solid was used in part B without further purification.

B. 2-(2Furyl)-5-nitro-benzimidazole

A stirred mixture of N-(2-amino-4-nitrophenyl)-2-furamide (125 g, 0.5 mole) in a solution of concentrated hydrochloric acid (400 ml) and 850 ml of water was heated on a steam bath for 3 hr. The reaction mixture after pouring into 4 liters of ice was treated with concentrated ammonium hydroxide until basic. The intermediate was filtered to give 104 g (91 percent).

C. 5-Amino-2-(2-furyl)benzimidazole

A solution of 2-(2-furyl)-5-nitrobenzimidazole (52 g, 0.2 mole) in 1 liter of absolute ethyl alcohol was reduced (Parr apparatus) using 5 percent palladium on cabon (50 percent wet) catalyst. An uptake of 44 lbs (100 percent of theory) of hydrogen in one-half hr was noted. After the reduction was complete the catalyst was removed by filtration. The filtrate was used in part D.

D. Ethyl 3-[2-(2-Furyl)-5-benzimidazolylamino]crotonate

A stirred mixture of the filtrate from part C (0.45 mole), 100 g of anhydrous calcium sulfate, ethyl acetoacetate (58.5 g, 0.45 mole), and 3 ml of glacial acetic acid, was heated at reflux for 12 hours. The warm reaction mixture was filtered. The filtrate was stripped in vacuo to give an oil which was triturated with anhydrous ether to give, after filtration, 77 g of tan solid (55 percent).

E. 2-(2-Furyl)-7-methyl-1H-imidazo[4,5-f]quinolin-9-ol Tetartohydrate

To a preheated (230°) solution of Dowtherm (500 ml) was added portion-wise 3-[ [2-(2-furyl)-5-benzimidazolyl]amino]crotonate (38.5 g, 0.1 mole). After the addition was complete the reaction mixture was kept at 230° for 15 minutes, then decanted into a beaker to form, upon cooling, a tan precipitate. The precipitate was filtered and washed with hexane to give 20 g (74 percent) of tan solid. Recrystallization from $CH_3NO_2$ gave m.p. 280°–282°.

| Anal. Calcd. for $C_{15}H_{11}N_3O_2 \cdot \frac{1}{4} H_2O$: | C, 66.78; | H, 4.30; | N, 15.58. |
|---|---|---|---|
| Found: | C, 66.56; | H, 4.43; | N, 15.40 |

EXAMPLE III

7-Methyl-2-p-tolyl-1H-imidazo[4,5-f]quinoline-9-ol Tetartohydrate

A. 2',4'--Dinitro-4-methylbenzanilide

To a stirred mixture of 2,4-dinitroaniline (73 g, 0.4 mole) in 400 ml of pyridine was added dropwise p-methylbenzoyl chloride (62 g, 0.4 mole). After the addition was complete the reaction mixture was heated at reflux for 3 hrs. The hot reaction solution was poured directly into 8 l of water. After standing at room temperature overnight the yellow precipitate was collected, washed with water and dried to give 115 g (95 percent).

B. 5-Amino-2(p-tolyl)benzimidazole

A mixture of 2',4'-dintiro-4-methylbenzanilide (57 g, 0.19 mole) in 1 l of ethanol was reduced (Parr apparatus) using 5 percent palladium on carbon catalyst. A pressure drop of 80 psi (100 percent of theory) was noted. After the reduction was complete the catalyst was removed by filtration while still warm. The filtrate was stripped in vacuo to near dryness to give, after filtration, 38 g of gray solid. The solid, after treatment with 1 l of water and 30 ml of concentrated hydrochloric acid, was heated on a steam bath for 3 hrs. The reaction mixture, after further dilution with 3 l of water, was treated with concentrated ammonium hydroxide until basic. The reaction mixture was allowed to stand at room temperature overnight and filtered to give, after water washing and drying 36 g (85 percent) of gray intermediate, m.p. 60°.

C. Ethyl 3-[5-(2-p-tolyl)benzimidazolylamino]crotonate

A stirred mixture of 5-amino-2(p-tolyl)benzimidazole (36 g, 0.16 mole), ethyl acetoacetate (21 g, 0.16 mole), 30 g of anhydrous calcium sulfate and 5 ml of glacial acetic acid in 400 ml of anhydrous alcohol was heated at reflux for 12 hours. The calcium sulfate was removed while the reaction mixture was still hot by filtration. The filtrate was stripped in vacuo to leave a red oily residue. The residue was used without purification in part D.

D. 7-Methyl-2-p-tolyl-1H-imidazo[4,5-f]quinolin-9-ol Tetartohydrate

To the stirred oil was added 800 ml of Dowtherm. The reaction solution was heated at the boiling point for 1 hour. The boiling reaction mixture was decanted to form a brown precipitate upon cooling. The product was collected and washed with hexane to give 33 g (70 percent). Recrystallization from $CH_3NO_2$ gave m.p. 280°.

| Calcd. for $C_{18}H_{15}N_3O \cdot \frac{1}{4} H_2O$: | C, 73.57; | H, 5.32; | N, 14.30 |
|---|---|---|---|
| Found: | C, 73.93; | H, 5.22; | N, 14.30 |

EXAMPLE IV 8,9-Dihydro-2-phenyl-7H-cyclopenta[2,3]-1H-imidazo[4,5-f]quinolin-10-ol A. Ethyl 2-[2-phenyl-5-benzimidazolyl)amino]-1-cyclopentene carboxylate A mixture of 64 g (0.41 moles) of ethyl 2-cyclopentanonecarboxylate, 86 g (0.41 moles) of 2-phenyl-5-aminobenzimidazole, 100 g of anhydrous calcium sulfate, 0.5 ml of HOAc and 1000 ml of ethanol was refluxed overnight with stirring. The calcium sulfate was removed by filtration and the ethanol filtrate concentrated to dryness in vacuo to yield 179 g of brown oil which solidified upon standing.

B. 8.9-Dihydro-2-phenyl-7H-cyclopenta[2,3]-1H-imidazo[4,5-f]quinolin-10-ol

To 1,700 ml of boiling Dowtherm was added 179 g (0.52 moles) of ethyl 2-[2-phenyl-5-benzimidazolyl)amino]-1-cyclopentane carboxylate (part A). The reaction mixture was heated at reflux for 30 min then allowed to cool to room temperature. The brown solid was collected by filtration, washed with Dowtherm, acetone and ether and then air-dried to give 127 g, m.p. 350°–393°C. The crude product was recrystallized from 500 ml of dimethylformamide with charcoal to give 60 g, m.p. 369°–375°C.

| Anal. Calcd. for $C_{19}H_{15}N_3O$: | C, 75.23; | H, 5.02; | N, 13.95 |
|---|---|---|---|
| Found: | c, 75.27; | H, 5.06; | N, 13.84 |

EXAMPLE V 7,8-Dimethyl-2-phenyl-1H-imidazo[4,5-f]quinolin-9-ol Hemihydrate

A. Ethyl 3-[5-(2-phenylbenzimidazolyl)amino]-2-methyl crotonate

A mixture of 90 g (0.43 moles) of 2-phenyl-5-aminobenzimidazole, 62 g (0.43 moles) of ethyl 2-methylacetoacetate, 100 g of anhydrous calcium sulfate. 0.5 ml of HOAc and 1,000 ml of ethanol was heated under reflux overnight. The anhydrous calcium sulfate was filtered off and the ethanol filtrate concentrated in vacuo to give 143 g of brown oil.

B. 7,8-Dimethyl-2-phenyl-1H-imidazo[4,5-f]quinolin-9-ol Hemihydrate

To 1,500 ml of boiling Dowtherm was added 143 g (0.43 moles) of ethyl 3-[5-(2-phenylbenzimidazolyl)amino]-2-methyl crotonate (part A). The reaction mixture was heated at reflux for 30 min, then allowed to cool to room temperature. The crude product was collected by filtration, washed with Dowtherm, acetone, ether and over dried (100°C) to give 86 g, m.p. 328°–338°C. Recrystallization from 1,000 ml of dimethylformamide $H_2O$, with charcoal, yielded 63 g.

| Anal. Calcd. for $C_{19}H_{15}N_3O \cdot \frac{1}{2} H_2O$: | C, 72.46; | H, 5.41; | N, 14.09 |
| Found: | C, 72.85; | H, 5.36; | N, 14.13 |

EXAMPLE VI 2,7-Diphenyl-1H-imidazo[4,5-f]quinolin-9-ol

A. Ethyl 3-[5-(2-phenylbenzimidazolyl)amino]-2-phenylcrotonate

A mixture of 86 g (0.41 moles) of 2-phenyl-5-aminobenzimidazole 79 g (0.41 moles) of ethylbenzoylacetate, 100 g of anhydrous calcium sulfate 0.5 ml of HOAc and 1,000 ml of ethanol was refluxed overnight with stirring. The calcium sulfate was removed by filtration and the ethanol filtrate concentrated in vacuo to yield 157 g of brown oil which solidified upon standing.

B. 2,7-Diphenyl-1H-imidazo[4,5-f]quinolin-9-ol

To 1,500 ml of boiling Dowtherm was added 157 g (0.41 moles) of ethyl 3-[5-(2-phenylbenzimidazolyl)amino]-2-phenylcrotonate (part A). After heating at reflux for 30 min, the reaction mixture was allowed to cool to room temperature. The solid precipitate was filtered, washed with Dowtherm, acetone, and ether, then oven-dried (110°C) to give 110 g, m.p. 344°–347°. The crude product was recrystallized from 500 ml of dimethylformamide with charcoal and precipitated by the addition of water to yield 80 g, m.p. 304°–307°C.

| Anal. Calcd. for $C_{22}H_{15}N_3O$: | C, 78.32; | H, 4.48; | N, 12.46 |
| Found: | C, 78.10; | H, 4.47; | N, 12.42 |

EXAMPLE VII 2-(o-Chlorophenyl)-7-methyl-1H-imidazo[4,5-f]quinolin-9-ol

A. 2-Chloro-(2',4'-dinitro)benzanilide

To a solution of 93 g (0.51 moles) of 2,4-dinitroaniline in 500 ml of pyridine with stirring and slight warming was added 89 g (0.51 moles) of o-chlorobenzoyl chloride. The reaction mixture was refluxed overnight, cooled to room temperature, then poured into 3 liters of ice water. The crude product was collected by filtration, washed with water and oven-dried to give 166 g, m.p. 142°–149°C. Recrystallization from 500 ml of dimethylformamide with charcoal and water added to precipitate yielded 140 g, m.p. 151°–154°C.

B. 2-Chloro-(2',4'-diamino)benzanilide

A mixture of 140 g (0.43 moles) of 2-chloro-(2',4'-dinitro)benzanilide (part A) and 800 ml of ethanol was reduced with hydrogen over one teaspoon of Raney nickel catalyst. A pressure drop of 200 psi was recorded (calcd. 175.5 psi). The catalyst was removed by filtration and the ethanol filtrate concentrated to dryness in vacuo. The residue was triturated with water, filtered and oven-dried to yield 103 g.

C. 2-(o-Chlorophenyl)-5-aminobenzimidazole

A solution of 103 g (0.39 moles) of 2-chloro-(2',4'-diamino)benzanilide (part B) in 1000 ml of water and 100 ml of conc. HCl was heated on a steam bath for 3 hours. The reaction mixture was basified to pH 8.0 with 28 percent NH₄OH keeping the temperature below 30°C. The dark purple precipitate was collected by filtration, washed with water and air-dried. Recrystallization from 2,500 ml of MeOH, followed by concentration of the MeOH filtrate gave 59 g.

D. Ethyl 3-[5-[2-(o-chlorophenyl)benzimidazolyl]amino]crotonate

A mixture of 59 g (0.24 moles) of 2-(o-chlorophenyl)-5-aminobenzimidazole (part C), 31.5 g (0.24 moles) of ethyl acetoacetate, 100 g of anhydrous calcium sulfate 0.5 ml of HOAc and 500 ml of ethanol was heated at reflux, stirring, for 12 hrs. The calcium sulfate was removed by filtration and the ethanol filtrate concentrated in vacuo to yield 78 g.

E. 2-(o-Chlorophenyl)-7-methyl-1H-imidazo[4,5-f]quinolin-9-ol

To 1000 ml of boiling Dowtherm was added 78 g (0.22 moles) of ethyl 3-[5-[o-chlorophenyl)benzimidazolyl]amino]crotonate (part D). After stirring for 15 min at reflux, the reaction mixture was allowed to cool to room temperature. The crude product was collected by filtration, washed with Dowtherm and hexane, then air-dried to give 64 g, m.p. 341°–348°C. A recrystallization from 800 ml of dimethylformamide with charcoal yielded 22 g, m.p. 366°–367°C.

| Anal. Calcd. for $C_{17}H_{12}ClN_3O$: | C, 65.92; | H, 3.90; | N, 13.57 |
| Found: | C, 65.36; | H, 3.82; | N, 13.61 |

The anthelmintic efficacy of members of the series of compounds of this invention was determined by a method which involves artifically infecting mice with *Hymenolepis nana*. A compound of formula (I) was administered to one group of mice while another group served as a control. At the end of the treatment period, each group was sacrificed, autopsied, and the number of worms in each was counted. The number of worms in the treated group as compared to the number of worms in the untreated group represents the percentage clearance effected by the compound. The results secured for the compounds of this invention are set forth in this fashion: Compound of Example (Dose per os in mg/kg b.i.d. for 3 days) (percent Clearance):

I (25) (94); II (50) (100); III (300) (70); IV (100) (100); V (50) (95); VI (50) (85); and VII (100) (100).

What is claimed is:

1. A compound of the formula

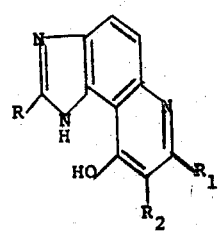

wherein R is phenyl, 2-furyl, p-tolyl, or o-chlorophenyl; $R_1$ is methyl or phenyl; $R_2$ is hydrogen or methyl and $R_1$ and $R_2$ taken together supply the atoms necessary to form the cyclopentyl ring.

2. The compound of claim 1 where R is phenyl; $R_1$ is methyl; and $R_2$ is hydrogen.

3. The compound of claim 1 wherein R is 2-furyl; $R_1$ is methyl; and $R_2$ is hydrogen.

4. The compound of claim 1 wherein R is p-tolyl; $R_1$ is methyl; and $R_2$ is hydrogen.

5. The compound of claim 1 wherein R is phenyl; and $R_1$ and $R_2$ taken together are cyclopentyl.

6. The compound of claim 1 wherein R is phenyl, $R_1$ is methyl; and $R_2$ is methyl.

7. The compound of claim 1 wherein R is phenyl; $R_1$ is phenyl; and $R_2$ is hydrogen.

8. The compound of claim 1 wherein R is o-chlorophenyl; $R_1$ is methyl and $R_2$ is hydrogen.

* * * * *